(12) United States Patent
Ruiz Dealbert et al.

(10) Patent No.: US 12,006,019 B2
(45) Date of Patent: Jun. 11, 2024

(54) STRUCTURAL INTERNAL REINFORCEMENT ELEMENT FOR A FUSELAGE, AND PROCEDURE FOR THE MANUFACTURE OF SAID STRUCTURAL ELEMENT

(71) Applicant: Muelles y Ballestas Hispano-Alemanas Projects, S.L, Villarreal (ES)

(72) Inventors: Miguel Ruiz Dealbert, Villarreal (ES); Juan Salamero Laorden, Villarreal (ES); Roberto Estal Vera, Villarreal (ES); María del Mar Cuetos Gómez, Villarreal (ES)

(73) Assignee: MUELLES Y BALLESTAS HISPANO-ALEMANAS PROJECTS, S.L., Villarreal (ES)

( * ) Notice: Subject to any disclaimer, the term of this patent is extended or adjusted under 35 U.S.C. 154(b) by 225 days.

(21) Appl. No.: 17/626,735

(22) PCT Filed: Jul. 9, 2020

(86) PCT No.: PCT/ES2020/070444
§ 371 (c)(1),
(2) Date: Jan. 12, 2022

(87) PCT Pub. No.: WO2021/009399
PCT Pub. Date: Jan. 21, 2021

(65) Prior Publication Data
US 2022/0297816 A1 Sep. 22, 2022

(30) Foreign Application Priority Data
Jul. 12, 2019 (EP) .................................. 19382591

(51) Int. Cl.
*B64C 1/06* (2006.01)
*B29D 99/00* (2010.01)
(Continued)

(52) U.S. Cl.
CPC .......... *B64C 1/061* (2013.01); *B29D 99/0014* (2013.01); *B64F 5/10* (2017.01); *B64C 2001/0072* (2013.01)

(58) Field of Classification Search
CPC ... B64C 1/061; B64C 2001/0072; B64F 5/10; B29D 99/0014
See application file for complete search history.

(56) References Cited

U.S. PATENT DOCUMENTS 4,294,639 A * 10/1981 Woelfel ................ B29C 70/003
264/258
5,024,399 A * 6/1991 Barquet ............. B29D 99/0003
244/119
(Continued)

FOREIGN PATENT DOCUMENTS

| EP | 2469196 A1 | 6/2012 |
|---|---|---|
| EP | 2532580 A2 | 12/2012 |
| WO | 2018109255 A1 | 6/2018 |

OTHER PUBLICATIONS

Extended European Search Report dated Dec. 2, 2019 in related European Application No. 19382591.6 filed Jul. 12, 2019 (9 pages).
(Continued)

*Primary Examiner* — Justin M Benedik
(74) *Attorney, Agent, or Firm* — Daniel F. Nesbitt; Nesbitt IP LLC (57) ABSTRACT

An internal structural reinforcement element for fuselages, where the internal structural reinforcement element has a longitudinal direction adapted for its placement in the longitudinal direction of the fuselage and a transversal direction perpendicular to the longitudinal direction, comprising:
(Continued)

an external reinforcement element,
an internal reinforcement element, located internally to the external reinforcement element in the transversal direction of the structural element,
where both reinforcement elements are manufactured from resin-impregnated fibre, and
an intermediate element, located between the external reinforcement element and the internal reinforcement element in the transversal direction of the structural element, the intermediate element being manufactured from pre-impregnated composite material.

17 Claims, 4 Drawing Sheets

(51) Int. Cl.
  *B64F 5/10* (2017.01)
  *B64C 1/00* (2006.01)

(56) References Cited

U.S. PATENT DOCUMENTS

| 5,108,810 | A  | * | 4/1992 | Williams | B29C 70/08 |
|---|---|---|---|---|---|
| | | | | | 428/36.1 |
| 2011/0052845 | A1 | * | 3/2011 | Dermond | B64C 1/068 |
| | | | | | 156/185 |
| 2014/0216638 | A1 | * | 8/2014 | Vetter | B64F 5/10 |
| | | | | | 156/227 |

OTHER PUBLICATIONS

International Search Report and Written Opinion dated Nov. 4, 2020 in corresponding International Application No. PCT/ES2020/070444 filed Jul. 12, 2019 (16 pages).

First Office Action dated Jan. 31, 2022 in related European Application No. 19382591.6 filed Jul. 12, 2019 (6 pages).

* cited by examiner

STRUCTURAL INTERNAL REINFORCEMENT ELEMENT FOR A FUSELAGE, AND PROCEDURE FOR THE MANUFACTURE OF SAID STRUCTURAL ELEMENT

CROSS-REFERENCE TO RELATED APPLICATIONS

The present application is a National Stage Entry of International Application Number PCT/ES2020/070444, filed Jul. 9, 2020, which claims the benefit of European Patent Application Number 19382591.6, filed Jul. 12, 2019, the disclosures of which are hereby incorporated by reference in their entireties.

FIELD OF THE INVENTION

The invention relates to the manufacture of a structural internal reinforcement element for fuselages, of a frame-like type, usable in the aeronautical, naval or railway sectors.

STATE OF THE ART

The function of the fuselage is to withstand compression, traction, shear, flexion and torsion stresses with no failure of its skin.

There are numerous types of fuselage which, throughout history, have enjoyed success in the field of transport; for example, the reinforced semi-monocoque fuselage is one of the most widely used, both in the aeronautical, naval and railway fields.

This type of fuselage consists of a normally cylindrical structure formed by a skin and a number of reinforcement elements located on the internal side of said skin; that is, on the side of the skin opposite to the side which is in contact with the surrounding fluid. The reinforcement elements comprise frames, beams, stringers and ribs.

Skin is the element of the fuselage structure that withstands the aerodynamic, rolling, static and dynamic loads. Its function is to endow the assembly with an aerodynamic shape, in addition to contributing to its structural strength.

In turn, the longitudinal elements, such as beams and stringers, are responsible for transmitting the loads acting upon the skin to the frames. The stringers withstand loads in a longitudinal direction, and endow the skin with rigidity, enabling a reduction in its thickness.

Finally, the transverse structural elements, such as the ribs and frames, in combination with the skin itself, contribute to providing shape to the fuselage and transverse rigidity to the structure. Ribs and frames are transverse stiffening elements. Among their functions, of particular note is their role in aiding the skin to withstand stresses and to maintain the cylindrical structure forming the fuselage.

There is considerable variety in the choice of materials for the manufacture of the frames. Depending on the application of the fuselage, this variety includes materials such as wood, steel, aluminium, or all types of alloys formed by elements as wide-ranging as titanium, silicon, magnesium, copper or zinc.

The industry is in search of solutions that provide the maximum mechanical properties possible, reduce the weight of the elements, and provide simple, economical manufacturing processes. It is for this reason that the current trend is to seek the automation of the maximum number of operations possible in the manufacture of the components, this entailing a significant reduction in manufacturing times, which in turn entails a reduction in costs.

It is also well known that for the manufacture of fuselages, composite materials are ever more widely used, for various reasons. On the one hand, due to their excellent mechanical properties with regard to their resistance to traction, compression and torsion, but in particular due to the reduction in weight achieved by means of the use thereof, these values being unachievable with the use of metallic materials. In addition to these advantages, others may be highlighted, such as an improvement in their resistance to fatigue and the absence of corrosion.

SUMMARY OF THE INVENTION

The object of the present invention is a structural element as an internal reinforcement for the manufacture of a fuselage, likewise the process for its manufacture.

This structural element, which may be a frame, that is, a transverse reinforcement element, is formed by two components: one which forms the principal part of the structural element and which will endow it with most of its final shape, manufactured from pre-impregnated composite material, for example SMC or BMC, reinforced by means of two reinforcement elements manufactured from fibre, which may be carbon fibre, impregnated with resin, which will be attached flush with both the interior and exterior of the previous element.

The object of the invention is therefore an internal structural reinforcement element for fuselages, featuring a longitudinal direction suited for its location in the longitudinal direction of the fuselage and a transverse direction perpendicular to its longitudinal direction, and is characterised in that it comprises:
  an external reinforcement element, which will be the element linking the remainder of the elements of the fuselage, and which is destined to be in contact with the internal side of the fuselage skin,
  an internal reinforcement element, located internally to the external reinforcement element in a direction transverse to the structural element, for the provision of rigidity in combination with the external element,
  where both elements are manufactured from resin-impregnated fibre; for example, both reinforcement elements are manufactured from dry fibre which is passed through a resin bath for its impregnation as a preliminary step, in one embodiment, to filament winding over a mandrel,
  an intermediate element located between the external reinforcement element and the internal reinforcement element, in the transverse direction of the structural element, the intermediate element being manufactured from pre-impregnated composite material, for example SMC or BMC.

Another object of this invention is the procedure for the manufacture of the internal structural reinforcement element for fuselages, characterised in that it comprises the following steps:
  a first male mould is provided, with the shape of an external reinforcement element,
  a second male mould is provided, with the shape of an internal reinforcement element and adapted to be placed internally to the external reinforcement element in a direction transverse to the structural element,
  resin-impregnated fibre is provided,
  part of the resin-impregnated fibre is placed on the first male mould, part of the resin-impregnated fibre is placed on the second male mould, the first male mould is removed, in such a way that the resin-impregnated fibre takes the form of the external reinforcement element, the second male mould is removed, in such a way that the resin-impregnated fibre takes the form of the internal reinforcement element, the internal and external reinforcement elements are placed in a mould, the internal reinforcement element located internally to the external reinforcement element in a direction transverse to the structural element, in such a way that a transverse hollow is defined between both reinforcement elements, the transverse hollow between the reinforcement elements is filled with pre-impregnated composite material, for example SMC or BMC, forming an intermediate element, and the compression moulding of the assembly is performed, to obtain the structural reinforcement element.

The above method of manufacture produces the bond between the component manufactured from pre-impregnated composite material and the two components manufactured from resin and fibre. This bond will form part of the manufacturing process, in such a way that the impregnated fibre and the component manufactured from pre-impregnated composite material become mutually embedded, and the joining of the two materials will be the manufacturing process in itself. The advantage of this manufacturing method lies in the achieving of a single component formed by two different types of material where no mechanical or adhesive joining is necessary. It is the pre-impregnated composite material itself which, during its shaping, adheres the internal and external reinforcements to itself.

In accordance with the above, the manufacturing procedure is performed by the technique of overmoulding with reinforcements where first, fibre reinforcements are manufactured, for example by filament winding, which will be inserted into the mould for the subsequent manufacture by compression moulding of the frame with pre-impregnated composite material.

In accordance with the above, it is possible first to start from a frame design according to the complete fuselage, bearing in mind the dimensions and materials of the remainder of the components of the structure, in particular the skin. This design will be drawn, for example, by means of a CAD programme, and will be calculated with a finite element programme. It will also be important to consider the future bonding between elements, in this case between the frame and the skin, and the adaptation of this bond to the remainder of the elements forming the fuselage. In the case of the bonding to the remainder of the elements of the fuselage, a similar system will be employed, commencing with an adhesive bond, reinforced with mechanical attachment should this be necessary.

In one embodiment, both male moulds have an approximately tubular shape, with their longitudinal axis in accordance with the longitudinal direction of the fuselage.

As has been mentioned above, in one specific embodiment, the structural reinforcement element corresponds to a frame. The first step in the manufacture of this frame corresponds to the manufacture of the fibre reinforcements. To this end, in one embodiment, a filament winding technique will be employed whereby, commencing with a previously machined mandrel, which may be metallic, fibre thread is wound, for example carbon fibre, impregnated with resin, for example epoxy resin, which will be deposited, layer upon layer, on the mandrel. On conclusion of the manufacturing process, the mandrel will be removed, yielding, in said embodiment, a tube manufactured from carbon fibre in accordance with the characteristics desired. It will be necessary to perform the process twice, in order to manufacture two tubes, one internal and one external, which will form the internal and external reinforcements of the frame, respectively.

The second step in the manufacture will be the compression moulding of pre-impregnated composite material. In turn, this will be performed by means of a reinforced overmoulding method. For the depositing of the pre-impregnated composite material there exist two embodiments:

it is deposited in the mould, filling the intermediate space between the external and internal reinforcements, and subsequently the mould is closed, or it is housed in a cavity located in the mould and is introduced into the intermediate space between the external and internal reinforcements subsequent to the closure of the mould.

The first, where the internal and external reinforcements, manufactured beforehand, are inserted into the mould, and then the space between them is filled with pre-impregnated composite material. Subsequently, the mould is closed, applying the appropriate temperature and pressure during a certain time interval.

The second embodiment, where the pre-impregnated material is not first introduced into the mould after positioning the reinforcements, but will be stored in a cavity located, for example, in the lower mould and will be forced in by a piston or similar subsequent to the closure of the mould with the reinforcements therein. In this way, as the mould is closed with the reinforcements located therein, in the space between the upper and lower sections, it is ensured that the internal and external reinforcements are correctly positioned prior to the addition of the composite material and, being fixed due to the closure of the mould, they will not move when the pre-impregnated material is introduced. This material, once introduced and due to the action of the temperature, will flow until it fills the entirety of the space available within the area around the internal and external reinforcements housed within the mould. This method represents an improvement with regard to the first, as it achieves the correct positioning of the internal and external reinforcements, in order to endow the assembly with the appropriate rigidity.

In either of the above cases, in addition to the reinforcements, the intermediate element might further comprise inserts, for example metallic inserts, in order to facilitate its joining with some other structural element of the craft. Once the structure of the reinforcement has been formed, the metal inserts would be perfectly inserted into the intermediate element, completely surrounded and grasped by the pre-impregnated material, that is, embedded. Said inserts may be of various geometric shapes, although it is important that their extremities be flat in order to maintain the flatness of the intermediate element.

The final result will be a structural reinforcement element, for example a frame manufactured by means of pre-impregnated composite material reinforced, for example, by two rings of dry fibre impregnated with resin and located at the interior and exterior of the frame. Said rings are embedded in the frame in order to endow the assembly with rigidity and to create an internal structural reinforcement element, able to lend inertia to the section of fuselage and to facilitate the bonding with the remainder of the elements of said fuselage, in particular with the skin, contributing to the maintenance of the shape thereof.

As has been mentioned above, the bonding of this frame to the remainder of the skin will be performed in two stages, commencing with an adhesive bond, to be performed through the external reinforcement manufactured by means of the winding of a filament of dry fibre impregnated in a bath of resin, and subsequently by means of a mechanical join, such as riveting. The importance of the prior preparation of surfaces should be stressed, in order to achieve the correct adhesion between both components. Should it be necessary to improve the join still further, the joining of the frame, via its intermediate element manufactured with pre-impregnated material, to the stiffeners of the skin might be considered. Likewise, this bond would be performed in two stages, first by adhesive bonding and subsequently reinforced by a mechanical join, such as riveting.

DESCRIPTION OF THE FIGURES

As a complement to the description, and for the purpose of aiding the better understanding of the invention, a set of figures is provided. Said figures form an integral part of the description and illustrate one embodiment of the invention.

DETAILED DESCRIPTION OF THE INVENTION

Figures 5, 6:
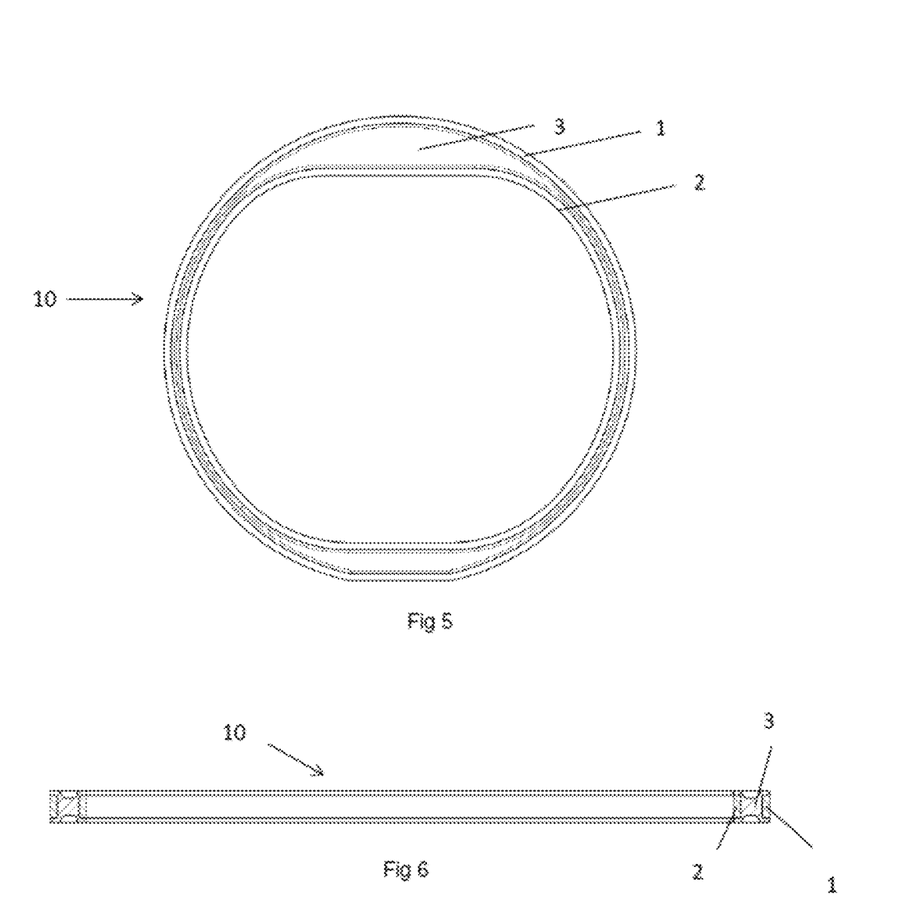
FIG. 5 portrays a frontal view of the embodiment of the frame, comprising the component of pre-impregnated material and both fibre reinforcements, internal and external.
FIG. 6 portrays a longitudinal cross-section of the frame of the embodiment corresponding to FIG. 5.

FIG. 5 portrays an embodiment of the invention which will act as a basis for the description of the reinforcement element which is the object of the invention, specifically portraying a frame (10) of the fuselage of a craft, consisting of an intermediate element (3) manufactured from pre-impregnated composite material, and two reinforcement elements (1, 2), made of carbon fibre, on both sides, in a direction transverse to that of the craft, manufactured in such a way that they become mutually embedded and form a single piece. This is achieved by means of the compression moulding of the assembly, or overmoulding, where first the resin-impregnated fibre reinforcement elements (1, 2) are manufactured, and subsequently the frame (10) is formed with pre-impregnated composite material, inserting the reinforcement elements (1, 2) into a mould in such a way that when the forming of the pre-impregnated composite material occurs, the reinforcement elements (1, 2) become integrated with the pre-impregnated composite material, forming a single component.

The frame (10) therefore comprises:
an external reinforcement element (1), which contributes to lend rigidity to the frame (10) and which acts as the element for bonding to the skin (9) of the fuselage,
an internal reinforcement element (2), located internally to the external reinforcement element (1) in a direction transverse to the frame (10), and
an intermediate element (3), located between the external reinforcement element (1) and the internal reinforcement element (2) in a direction transverse to the frame (10).

Figure 3:
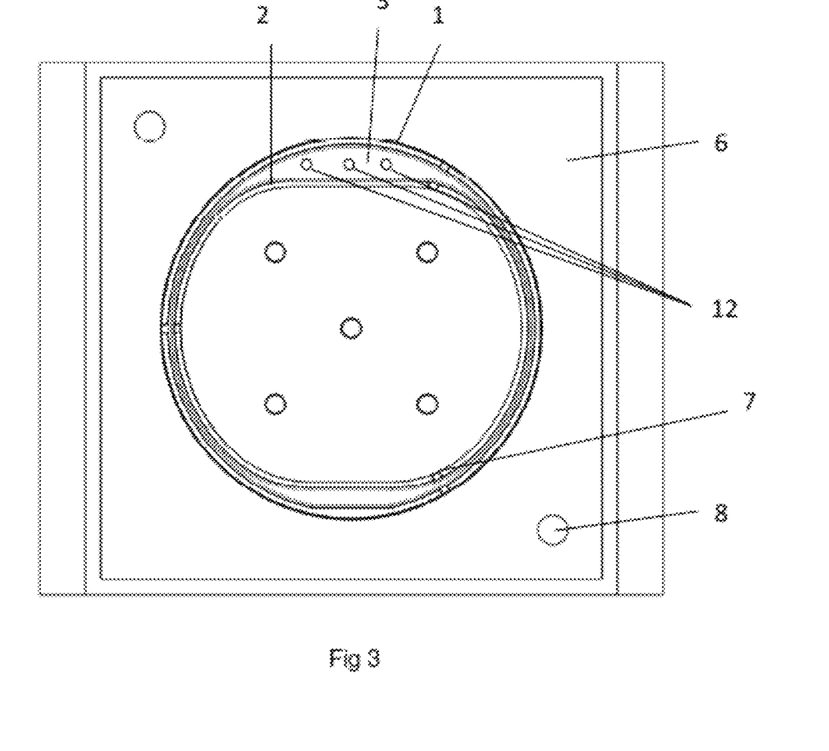
FIG. 3 portrays a plan view of the lower part of a mould for the manufacture of the frame of the embodiment in FIGS. 1 and 2, in accordance with a first embodiment.

In addition, the frame (10) may also comprise one or several inserts (12), which may be metallic, located at any position within the intermediate element (3), as portrayed in FIG. 3.

In one embodiment, the reinforcement elements (1, 2) are made of dry fibre impregnated in a bath of resin; more specifically, they may be made of resin-impregnated carbon fibre.

Figure 1:
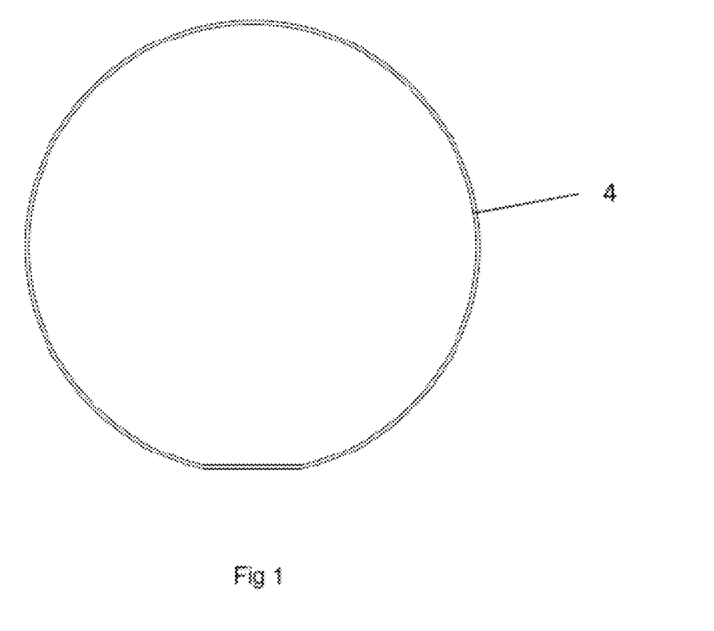
FIG. 1 portrays a frontal view of an embodiment of a first male mould for the manufacture of the external reinforcement element of the frame of a craft.
Figure 2:
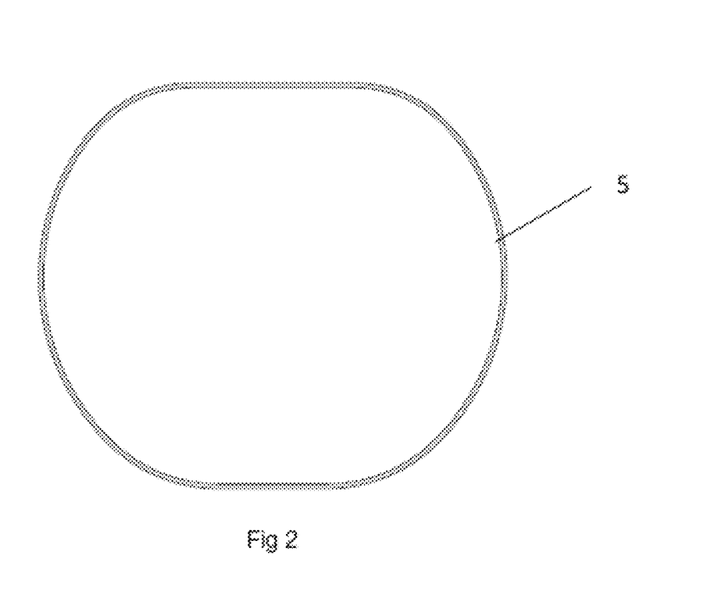
FIG. 2 portrays a frontal view of an embodiment of a second male mould for the manufacture of the internal reinforcement element of the frame of a craft.

For the manufacture of the external and internal reinforcement elements (1, 2), a number of male moulds (4, 5) are provided, portrayed in FIGS. 1 and 2, which in the embodiment portrayed in the figures are tubular in shape, and furthermore, may be metallic; these will be the guide for the manufacture of said external and internal elements (1, 2) which will constitute the reinforcement elements of the frame (10).

FIG. 1 portrays an embodiment of a first male mould (4) for the manufacture of the external reinforcement element (1). In one embodiment, the fibre is in the form of a filament, and this first male mould (4) will act as a guide for a filament winding procedure by means of which the external reinforcement element (1), which will act as the external reinforcement of the frame (10), will be manufactured.

Likewise, FIG. 2 portrays the second male mould (5), which will act as a guide for the internal reinforcement element (2) of the frame (10).

In the embodiment, the stage of placing the resin-impregnated fibre on the first and second male moulds (4, 5) is performed by means of the winding of at least one filament of resin-impregnated fibre on the male mould (4, 5). To this end, the male moulds (4, 5) rotate at a suitable speed for the depositing of the fibre thereon. Depending on the speed of rotation, the number of turns and the direction of depositing the fibre, the quantity of fibre deposited may be varied, and thereby the rigidity of the external and internal reinforcements (1, 2).

In one embodiment, the resin-impregnated fibre is dry fibre impregnated in a bath of resin as a preliminary stage to its placement on the first and second male moulds (4, 5)

Subsequently, in the embodiment portrayed, the external and internal reinforcement tubes (1, 2), manufactured beforehand, are placed in a first part of a mould (6), resting against a number of tabs (7) to facilitate their placement and the subsequent extraction of the assembly. Next, the space between both reinforcement elements (1, 2) is filled with pre-impregnated composite material which will later be formed by means of compression moulding.

In FIG. 3, the footprint of where the previously manufactured reinforcement elements (1, 2) are lodged may be seen; this corresponds to the position of the tabs (7). The space where the intermediate pre-impregnated composite material (3) will be placed for its shaping may also be seen.

In accordance with the above, FIG. 3 portrays a plan view of the mould (6) wherein the reinforcement elements (1, 2) are located; these will be placed at the lower part of the mould (6), resting on the tabs (7) machined expressly to adapt the position of the same (1, 2). In a first embodiment of the execution of this compression moulding, on completion of the stage of positioning the reinforcement elements (1, 2), the pre-impregnated composite material, SMC or BMC, will be placed in the space between both reinforcement elements (1, 2), filling the entire space designed to house the frame (10). Next, the mould (6) will be closed, with the upper part of the same (6) adjusting the coupling by means of a number of centring elements (8).

Figure 4:
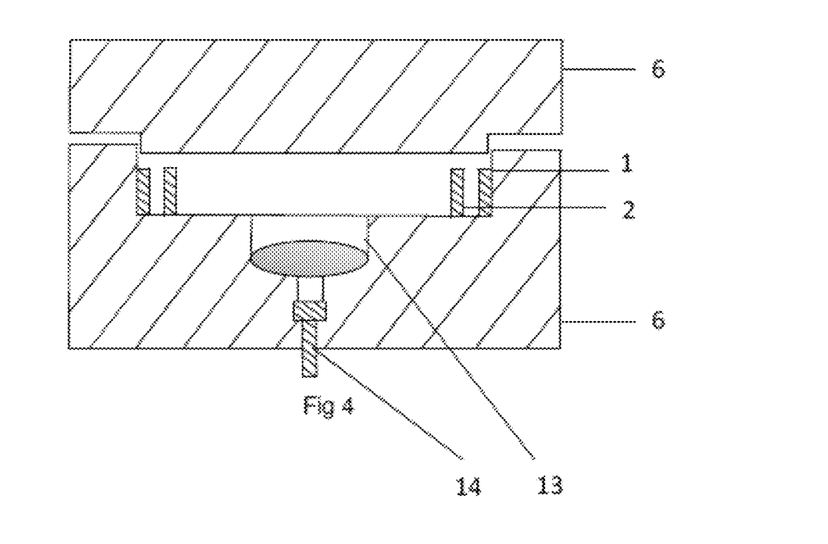
FIG. 4 portrays a transverse cross-section of the mould for the manufacture of the frame, in accordance with a second embodiment.

In another embodiment, portrayed in FIG. 4, for the execution of this compression moulding, the pre-impregnated composite material, SMC or BMC, is located in a cavity (13) in the lower mould (6), from where, after closure of the upper and lower mould (6), the pre-impregnated composite material will be forced into the space between the external and internal reinforcement elements (1, 2) by the action of a piston (14) or similar. In this way, the correct position of the reinforcements (1, 2) is ensured prior to the addition of the pre-impregnated material which will fill the space in the mould (6) and will be formed around said reinforcements (1, 2).

The upper part of the mould (6) will have a footprint with the shape of the frame (10), so that on closing the complete mould (6), the frame will be formed in accordance with its final shape. Both sections of the mould (6), previously heated, will be closed under specific conditions of temperature and pressure, during a set period of time, until the frame (10) is formed.

FIG. 6 portrays a longitudinal cross-sectional view of an embodiment of the frame (10), in such a way that the final aspect of the assembly may be seen, consisting of the intermediate element (3), manufactured from pre-impregnated composite material, and the two reinforcement elements (1, 2), of resin-impregnated fibre, located on both sides in a direction transverse to that of the frame (10), manufactured in such a way as to become mutually embedded and to form a single piece.

Figure 7:
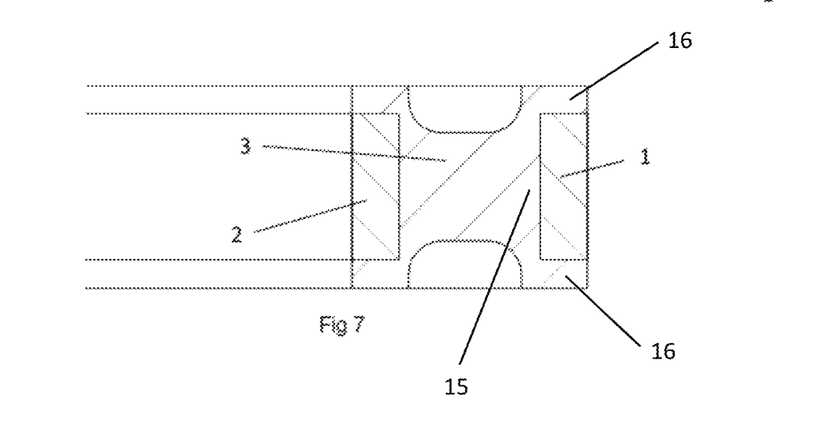
FIG. 7 portrays an enlargement of the longitudinal cross-section of the frame corresponding to FIG. 6.

FIG. 7 portrays an enlargement of the cross-section of the frame (10), revealing the shape of the intermediate element (3), manufactured from pre-impregnated composite material, and that of the two reinforcement elements (1, 2), made of fibre. The external reinforcement (1) may be seen at the external part, and the internal reinforcement (2) may be observed in the interior.

In this figure it may also be observed that the external and internal reinforcement elements (1, 2) are located between the intermediate element (3), in the longitudinal direction of the structural element, as the intermediate element (3) features, in the longitudinal direction of the frame (10), an H-shaped cross-section, with a web (15) in a longitudinal direction and the corresponding flanges (16) in a direction transverse to the structural element, the external and internal reinforcement elements (1, 2) being embedded longitudinally in the frame (10), between the flanges (16) of the intermediate element (3). In this way, the bond between the different elements of the frame (10) is improved.

Figure 8:
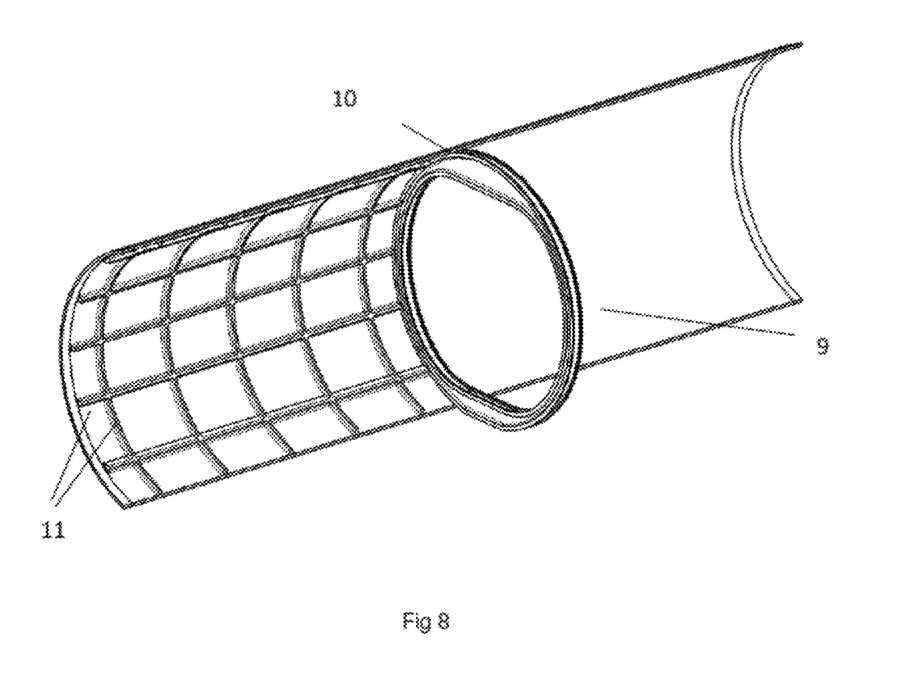
FIG. 8 portrays a perspective view of a portion of the fuselage of a craft, revealing the frame of the embodiment corresponding to the previous figures, the skin and the stringers and beams of the same.

FIG. 8 portrays the assembly of the frame (10) with the skin (9) and with the longitudinal and transverse reinforcement elements (11) of a fuselage. The bonding of the frame (10) to the skin (9) will be via the external reinforcement element (1) by means of mechanical bonding, such as adhesives and riveting.

In addition, there will also be a bond between the frame (10), via its intermediate element (3), manufactured from pre-impregnated material, and the longitudinal and transverse stiffeners (11). Similarly, to the bond between frame (10) and skin (9), this bond will be performed in two stages; first by adhesive bonding and then by mechanical joining, such as riveting, in order to ensure the correct joining of the fuselage assembly.

The invention claimed is:

1. An internal structural reinforcement element for fuselages, where the internal structural reinforcement element has a longitudinal direction adapted for its location in the longitudinal direction of the fuselage and a transverse direction perpendicular to its longitudinal direction, comprising:
   an external reinforcement element,
   an internal reinforcement element, located internally to the external reinforcement element in the transverse direction of the structural element,
   where both reinforcement elements are manufactured from resin-impregnated fibre, and
   an intermediate element, located between the external reinforcement element and the internal reinforcement element in the transverse direction of the structural element, the intermediate element being manufactured from pre-impregnated composite material, and the intermediate element comprising an H-shaped cross-section with flanges in the transverse direction of the structural element, in such a way that in the longitudinal direction of the structural element, the external and internal reinforcement elements are located between the flanges of the intermediate element.

2. The internal structural reinforcement element for fuselages, as claimed in claim 1, wherein the resin-impregnated fibre of the internal and external reinforcement elements is dry fibre impregnated in a bath of resin.

3. The internal structural reinforcement element for fuselages, as claimed in claim 2, wherein the fibre of the internal and external reinforcement elements is carbon fibre.

4. The internal structural reinforcement element for fuselages, as claimed in claim 2, wherein the impregnated fibre of the internal and external reinforcement elements is in the form of a filament.

5. The internal structural reinforcement element for fuselages, as claimed in claim 1, wherein the fibre of the internal and external reinforcement elements is carbon fibre.

6. The internal structural reinforcement element for fuselages, as claimed in claim 5, wherein the impregnated fibre of the internal and external reinforcement elements is in the form of a filament.

7. The internal structural reinforcement element for fuselages, as claimed in claim 1, wherein the impregnated fibre of the internal and external reinforcement elements is in the form of a filament.

8. The internal structural reinforcement element for fuselages, as claimed in claim 1, wherein the external reinforcement element and the internal reinforcement element have a tubular shape with their longitudinal axis in accordance with the longitudinal direction of the structural element.

9. The internal structural reinforcement element for fuselages, as claimed in claim 1, wherein the pre-impregnated composite material of the intermediate element is Sheet Moulding Compound (SMC) or Bulk Moulding Compound (BMC).

10. The internal structural reinforcement element for fuselages, as claimed in claim 1, wherein the intermediate element comprises a number of inserts for their joining to the fuselage.

11. The internal structural reinforcement element for fuselages, as claimed in claim 10, wherein the inserts are metallic.

12. A method for the manufacture of an internal structural reinforcement element for fuselages, where the internal structural reinforcement element has a longitudinal direction adapted for its location in the longitudinal direction of the fuselage and a transverse direction perpendicular to the longitudinal direction, comprising the following steps:
   providing a first male mould, with the shape of an external reinforcement element,
   providing a second male mould, with the shape of an internal reinforcement element, the internal reinforcement element being adapted to be placed internally to the external reinforcement element in a direction transverse to the structural element,
   providing resin-impregnated fibre,
   placing part of the resin-impregnated fibre on the first male mould,
   placing part of the resin-impregnated fibre on the second male mould,
   removing the first male mould, so that the resin-impregnated fibre takes the form of the external reinforcement element,
   removing the second male mould, so that the resin-impregnated fibre takes the form of the internal reinforcement element,
   placing the internal and external reinforcement elements in a mould, the internal reinforcement element located internally to the external reinforcement element in a direction transverse to the structural element, in such a way that a transverse hollow is defined between both reinforcement elements,
   filling the transverse hollow between the internal and external reinforcement elements with pre-impregnated composite material, forming an intermediate element, and
   performing the compression moulding of the assembly, to obtain the structural reinforcement element.

13. The method for the manufacture of an internal structural reinforcement element for fuselages, as claimed in claim 12, wherein the first and second male moulds have a tubular shape.

14. The method for the manufacture of an internal structural reinforcement element for fuselages, as claimed in claim 12, wherein the step of placing the resin-impregnated fibre on the first and second male moulds is performed by means of the winding of at least one resin-impregnated fibre filament around the male mould.

15. The method for the manufacture of an internal structural reinforcement element for fuselages, as claimed in claim 12, wherein the pre-impregnated composite material of the intermediate element:
   is deposited in the mould, filling the intermediate space between the external and internal reinforcements, and subsequently the mould is closed, or
   is housed in a cavity located in the mould and is introduced into the intermediate space between the external and internal reinforcements subsequent to the closure of the mould.

16. The method for the manufacture of an internal structural reinforcement element for fuselages, as claimed in claim 12, wherein the resin-impregnated fibre is dry fibre impregnated in a resin bath prior to its placing on the male mould.

17. The method for the manufacture of an internal structural reinforcement element for fuselages, as claimed in claim 12, wherein the pre-impregnated composite material of the intermediate element is Sheet Moulding Compound (SMC) or Bulk Moulding Compound (BMC).

* * * * *